March 31, 1953     K. H. WILCOXON     2,633,375
SWIVEL
Filed Dec. 1, 1947
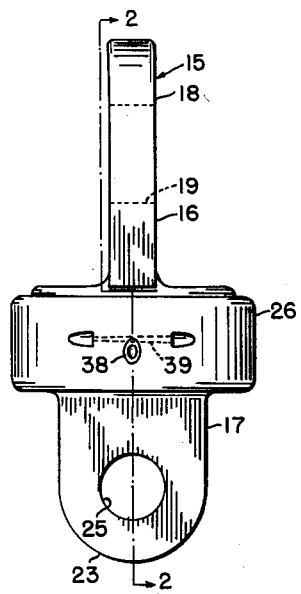
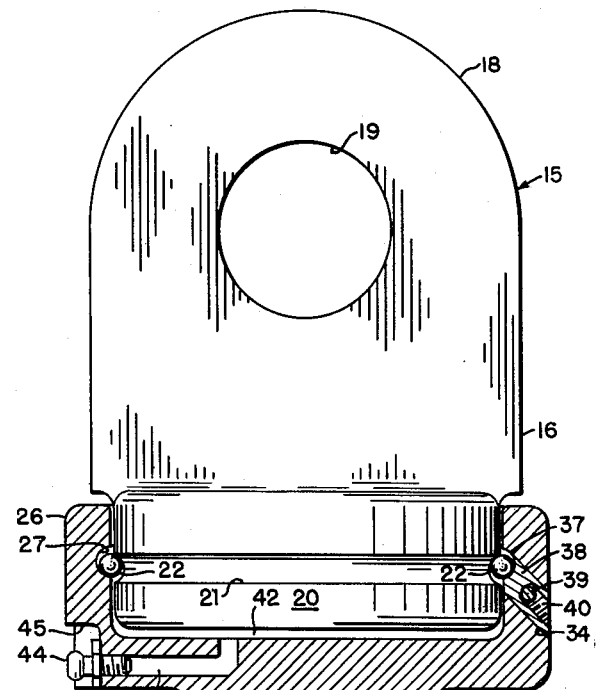
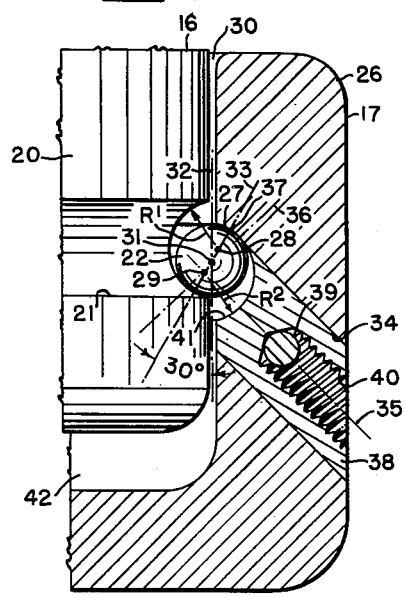
INVENTOR.
Kenneth H. Wilcoxon
BY
ATTORNEY.

Patented Mar. 31, 1953

2,633,375

UNITED STATES PATENT OFFICE 2,633,375

SWIVEL

Kenneth H. Wilcoxon, Cabin John, Md.

Application December 1, 1947, Serial No. 789,008

1 Claim. (Cl. 287—91)

(Granted under Title 35, U. S. Code (1952), sec. 266)

The present invention relates to improvements in swivels and more specifically to a heavy duty ball-bearing swivel for transmitting axial tension loads.

In towing special nautical devices, such as paravanes, otter boards, floats and mine sweeping equipment, various conditions of operation are encountered wherein sufficient torque is produced in the underwater tow cable to interfere with the stability and control of the towed body.

An important object of the invention is to provide an improved underwater swivel for insertion in a tow cable, or between the tow cable and the object to be towed, which will turn freely while subjected to heavy axial tension loads.

Another object of the invention is the provision of an improved ball-bearing swivel so constructed that the diameter and weight of swivel required for transmitting a given axial tension load without failure is small whereby the resistance to towing the swivel underwater is minimized.

A further object is the provision of a ball bearing swivel including an improved outer race so constructed as to permit removable insertion of balls in the race but not interfering with the smooth uninterrupted continuity of the race along the normal path of travel of the balls.

Other objects and advantages of the invention will become apparent during the course of the following detailed description, taken in connection with the accompanying drawing, forming a part of this specification, and in which drawing, Figure 1 is a side elevational view of the improved swivel.

Figure 2 is a view of the swivel partly in central longitudinal section and partly in side elevation taken substantially on the line 2—2 of Figure 1, the parts being shown in the relationship that exists when the swivel is not transmitting a load.

Figure 3 is an enlarged fragmentary detail view of the swivel showing the outer race construction in central longitudinal section, the parts being shown in the relationship that exists when the swivel is transmitting an axial tension load.

In the drawing, which for the purpose of illustration shows only a preferred embodiment of the invention, and wherein similar reference characters denote corresponding parts throughout the views, numeral 15 generally designates the swivel assembly including complementary plug and socket members 16, 17. One end portion 18 of the plug member 16 is shaped to provide an eye 19 for attachment of the swivel to an underwater tow cable (not shown). Formed at the opposite end portion of the plug member is a cylindrical body 20 provided with a peripheral groove 21 constituting an inner race for an annular series of balls 22.

Referring now to the socket member 17, one end portion 23 is shaped to provide two eyes 24, 25 permitting attachment of the swivel to a towed object, such as the water kite shown in U. S. Patent 2,403,036 granted to Wilcoxon and Landweber. Formed at the opposite end portion of the member 17 is an annular flange 26 telescopically sliding over the cylindrical body portion 20 of the plug member 16, and provided with an internal peripheral groove 27 constituting an outer race for the annular series of balls 22.

In the example shown, the grooves 21, 27 are defined by 0.125 inch radii $R^1$, $R^2$ originating in 3.092 inch and 3.026 inch circles respectively concentric with the longitudinal axis of the swivel and intersecting the central vertical sectional plane of Figure 3 at points 28, 29 respectively. The radii $R^1$, $R^2$ are approximately one-sixth greater than the depth of the races or grooves 21, 27. The clearance space 30 between the cylindrical body 20 and the annular flange 26 is .006 inch, and the diameter of the balls 22 is $\frac{5}{16}$ inch. The capacity of the inner race is fifty balls.

When an axial tension load is transmitted by the swivel, the relationship of parts is that illustrated in Figure 3. The center 31 of each ball 22 will lie on a line 32 in the clearance space 30 and the load will be transmitted through each ball 22 along a line 33 defined by points 28, 29. This line 33 is disposed at an angle of approximately 30° to the longitudinal axis of the swivel.

In assembling the swivel, the plug and socket members 16, 17 are disposed in telescopic relation and the balls 22 are inserted into the inner race 21 through a circular hole 34 extending between the outer race 27 and the outer periphery of the flange 26 near its base. The longitudinal axis 35 of this hole is disposed at an angle of 45° to the longitudinal axis of the swivel and intersects point 29, as shown in Figure 3. In the example shown, the hole 34 is ¼ inch in diameter and extends no farther than a plane normally intersecting axis 35 at point 29, as indicated by line 36. Thus, there is left a smooth, uninterrupted path of travel along the upper margin 37 of the ball race. Inserted in the hole 34 is a filler 38 rigidly secured in a predetermined position by a transverse taper pin 39 fitted in the wall of the flange 26. In the filler 38 is an opening having a screw-threaded wall 40 for connection with any suitable pulling tool whenever removal of the filler 38 becomes necessary. The forward end 41 of the filler is previously ground to conform to the curvature of the normally untraveled interrupted inner marginal portion of the outer race 27 with the filler rigidly secured in position by the taper pin. When a longitudinal tension load is applied to the swivel, the load is transmitted between the plug and socket members 16, 17 at an angle of approximately 30° through the balls 22, as shown in Figure 3. Thus the normal path of travel of the balls during rotation of the swivel while subjected to longitudinal tension loads is along the smooth uninterrupted upper margin 37 of the ball race so that the life of the balls 22 and races 21, 27 will tend to be prolonged.

Communicating with the clearance space 42 between the cylindrical plug body 20 and the socket base is a lubricant passageway 43 provided at its outer end with a grease fitting 44. This fitting 44 may be disposed in a recess 45 in the base of the annular flange 26 whereby the exterior of the swivel is devoid of projecting parts. The presence of grease in chamber 42 will insure proper lubrication of the bearing and tend to exclude water therefrom.

Various changes may be made in the form of invention herein shown and described without departing from the spirit of the invention or the scope of the following claim.

The invention described herein may be manufactured and used by or for the Government of the United States of America for governmental purposes without the payment of any royalties thereon or therefor.

I claim:

In a swivel for transmitting axial tension loads, a first member including a cylindrical body, a second member including an annular flange telescopically about an end of said cylindrical body, said body and flange being generally coaxial and having facing cylindrical surfaces with a small clearance therebetween, said flange having only a single outer ball race, said body opposite said flange having only a single inner ball race, said ball races being co-axial with said body and flange, said ball races facing each other and forming arcs of circles in axial cross section, each arc being less than a semi-circle, with the radius of the arc approximately one-sixth greater than the maximum depth of the arc, the center of the arc associated with the inner ball race lying outwardly of said surface of said body, the center of the arc associated with the outer ball race lying inwardly of said surface of said flange, said centers lying in an axial plane being axially displaced and lying on a line forming approximately a 30° angle with the longitudinal axis of the swivel, whereby said ball races are axially displaced in opposite directions, a plurality of balls disposed in said races, each of said balls having a radius which is approximately three-fourths of the radius of said arcs, whereby said balls normally bear only on annular marginal portions of said ball races when the swivel is transmitting axial loads, said marginal portion of each of said ball races lying opposite a deeper part of the other ball race, said flange being provided with an opening passing therethrough which intersects said outer ball race only at a portion beyond said annular marginal portion thereof, and also intersecting said cylindrical surface of said flange, the size of said opening being larger than that of said balls, whereby said balls can pass through said opening, and a filler removably fixed in a predetermined position in said opening, said filler having its inner edge shaped to conform to said outer ball race at said opening and to said cylindrical surface at said opening.

KENNETH H. WILCOXON.

REFERENCES CITED

The following references are of record in the file of this patent:

UNITED STATES PATENTS

| Number | Name | Date |
|---|---|---|
| 933,625 | Clarkson | Sept. 7, 1909 |
| 1,174,542 | Bernheim | Mar. 7, 1916 |
| 1,448,189 | Brunner | Mar. 13, 1923 |
| 2,315,574 | Anderson | Apr. 6, 1943 |
| 2,387,599 | Miller et al. | Oct. 23, 1945 |

FOREIGN PATENTS

| Number | Country | Date |
|---|---|---|
| 725,217 | France | of 1932 |